UNITED STATES PATENT OFFICE.

FERDINAND PETERSEN, OF BASLE, SWITZERLAND, ASSIGNOR TO FERD. PETERSEN & CO., OF SCHWEIZERHALLE, NEAR BASLE, SWITZERLAND.

SUBSTANTIVE COTTON DYE.

SPECIFICATION forming part of Letters Patent No. 578,580, dated March 9, 1897.

Application filed July 3, 1896. Serial No. 597,933. (Specimens.)

*To all whom it may concern:*

Be it known that I, FERDINAND PETERSEN, manufacturer, a citizen of the Swiss Republic, residing at Basle, Switzerland, have invented certain Improvements in the Manufacture of Substantive Cotton Dyestuffs, of which the following is a clear and complete specification.

By combination of the sulfo-acids of paradiphenyl bases with the amidonaphthol-sulfo-acids by themselves or with other ingredients, also by diazotizing the simple compounds so formed and further combining them with amins, phenols, and their derivatives, an immense number of products can be obtained. It appears, however, to be a rule that the sulfo groups of the diphenyl bases in the simple as well as the more complex combinations lessen and often quite destroy the affinity to vegetable fiber, so that these derivatives, however many may be imagined, cannot be considered to be direct-acting coloring-matters.

Hitherto none of the possible dyestuff groups, nor any number of them, has been described.

Numerous experiments now show that it appears quite impossible to obtain so-called "directly-dyeing" coloring-matters by means of the sulfo-acids of bases such as diamidodiphenylamin and paraphenylenediamin; also, the derivatives of the dianisidin and tolidin sulfo-acids show in their simple as well as in their more complex combinations, except shades of little value, very little or no affinity to vegetable fiber.

The coloring-matters derived from the benzidinsulfo-acids dye either badly or not at all.

I have now found that the benzidinsulfo-acids which have been described by P. Griess (*Berichte der Deutschen Chem. Gesellschaft*, Vol. 14, p. 300) as isomeric disulfo-acids produce, with gammaämidonaphtholsulfo-acid, new products, which, although of themselves of no special advantage as dyestuffs, yet surpass the corresponding products of other benzidinsulfo-acids in the peculiarity that when they are diazotized and combined with a certain number of developing agents they produce valuable and successful dyestuffs. Some of these dyestuffs really dye considerably better than the corresponding derivatives that have been produced by means of a non-sulfonated benzidin base, so that the dyer using them can employ weaker baths.

These new dyestuffs have the formula

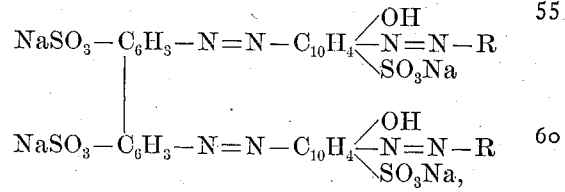

in which R indicates any developing agent.

With the following developers there are produced the following tints:

| Developers. | Tints. |
|---|---|
| Anilin | Reddish blue. |
| Orthotoluidin | Do. |
| Paratoluidin | Do. |
| Metaphenylenediamin | Blue-black. |
| Metatoluylenediamin | Do. |
| Alpha-naphthylamin | Bluish red. |
| Beta-naphthylamin | Do. |
| Naphthionate | Blue. |

All the new products are black powders, are quite soluble in both hot and cold water, and they dye non-mordanted cotton bluish red to blue-black. They are insoluble in alcohol.

The dyes can be produced on the fiber by treating the fiber first with the dyestuff from the tetrazo derivative of a Griess benzidin-sulfo-acid and gammaämidonaphthol-sulfo-acid. This dye can then be further diazotized on the fiber, which is finally treated with a developing solution.

*Example.*—The tetrazo body derived from a quantity of one of the Griess sulfo-acids, or of a mixture of both acids corresponding to ten kilos of nitrite, is combined with thirty-four kilos of gammaämidonaphthol - sulfo-acid in alkaline solution. The new intermediate body thus formed is separated or may be further diazotized in the solution and is combined with twenty-three kilos of metaphenylenediamin. The dyestuff thus produced separates as a black precipitate. It dyes cotton an intense blue-black and is fast to light and washing. It is readily soluble in both hot and cold water and insoluble in alcohol. Its solution in concentrated sulfuric acid is bluish green, and when this is diluted a black precipitate is formed. Its solution in water is reddish brown, and when hydrochloric acid is added there is a reddish-brown precipitate. When caustic soda is added to an aqueous solution of the dyestuff, there is a brown precipitate.

What I claim is—

1. The improvement in the manufacture of substantive cotton dyestuffs consisting in the combination of a molecule of the tetrazo derivative of the Griess benzidinsulfo-acids with two molecules of gammaämidonaphthol-sulfo-acid.

2. The improvement in the manufacture of substantive cotton dyestuffs consisting in the combination of one molecule of the tetrazo derivative of the Griess benzidinsulfo-acids with two molecules of gammaämidonaphthol-sulfo-acid, the further diazotation of the dyestuff thus obtained and the subsequent combination of the diazotized dyestuff with two molecules of developing agents.

3. The improvement in the manufacture of substantive cotton dyestuffs consisting in the combination of one molecule of the tetrazo derivative of the Griess benzidinsulfo-acids with two molecules of gammaämidonaphthol-sulfo-acid, the further diazotation of the dyestuff thus obtained and the subsequent combination of the diazotized dyestuff with two molecules of aromatic amido compounds.

4. The improvement in the manufacture of substantive cotton dyestuffs consisting in the combination of one molecule of the tetrazo derivative of the Griess benzidinsulfo-acids with two molecules of gammaämidonaphthol-sulfo-acid, the further diazotation of the dyestuff thus obtained and the subsequent combination of the diazotized dyestuff with two molecules of an aromatic metadiamin.

5. As a new article of manufacture, the herein-described blue-black substantive cotton dyestuff derived from a Griess benzidinsulfo-acid, gammaämidonaphtholsulfo-acid and paraphenylenediamin, which constitutes in dry state a black powder, dyes cotton an intense blue-black fast to light and washing, is readily soluble in both cold and hot water, insoluble in alcohol, dissolves in concentrated sulfuric acid with a bluish-green coloration and in water with reddish-brown coloration and gives when hydrochloric acid is added to its aqueous solutions a reddish-brown precipitate and when caustic soda is added to its aqueous solutions a brown precipitate.

In witness whereof I have hereunto signed my name in the presence of two subscribing witnesses.

FERDINAND PETERSEN.

Witnesses:
GEORGE GIFFORD,
AMAND RITTER.